United States Patent [19]

Yamasaki et al.

[11] Patent Number: 5,339,446
[45] Date of Patent: Aug. 16, 1994

[54] POWER SUPPLY AND METHOD FOR USE IN A COMPUTER SYSTEM TO CONFIRM A SAVE OPERATION OF THE COMPUTER SYSTEM AND TO STOP A SUPPLY OF POWER TO THE COMPUTER SYSTEM AFTER CONFIRMATION

[75] Inventors: Takuma Yamasaki; Yuuichi Saito, both of Tokyo, Japan

[73] Assignee: Kabushiki Kaisha Toshiba, Kawasaki, Japan

[21] Appl. No.: 62,733

[22] Filed: May 18, 1993

Related U.S. Application Data

[63] Continuation of Ser. No. 962,039, Oct. 15, 1992, abandoned, which is a continuation of Ser. No. 884,451, May 14, 1992, abandoned, which is a continuation of Ser. No. 571,839, Aug. 23, 1990, abandoned, which is a continuation of Ser. No. 134,370, Dec. 17, 1987, abandoned.

[30] Foreign Application Priority Data

Dec. 26, 1986 [JP] Japan .................... 61-315314

[51] Int. Cl.$^5$ ........................... G06F 11/00
[52] U.S. Cl. .................. 395/750; 364/DIG. 2; 364/948.4; 364/948.5; 364/948.9; 364/943.91
[58] Field of Search ............... 395/750, 800

[56] References Cited

U.S. PATENT DOCUMENTS

| | | |
|---|---|---|
| 3,755,806 | 8/1973 | Bunting . |
| 3,757,302 | 9/1973 | Pollitt .................. 364/900 |
| 3,801,963 | 4/1974 | Chen . |
| 3,959,778 | 5/1976 | Brette . |
| 3,979,657 | 9/1976 | Yorksie . |
| 4,061,955 | 12/1977 | Thomas et al. . |
| 4,079,448 | 3/1978 | N'Gayen et al. . |
| 4,096,560 | 6/1978 | Footh . |
| 4,122,359 | 10/1978 | Breikss . |
| 4,143,283 | 3/1979 | Graf et al. .............. 364/900 |
| 4,193,025 | 3/1980 | Frailing et al. . |
| 4,198,698 | 4/1980 | Ong et al. . |
| 4,203,153 | 5/1980 | Boyd . |
| 4,234,920 | 11/1980 | Van Ness et al. ............. 364/200 |
| 4,307,455 | 12/1981 | Juhasz et al. .............. 364/900 |
| 4,365,290 | 12/1982 | Nelms et al. . |
| 4,422,163 | 12/1983 | Oldenkamp . |
| 4,458,307 | 7/1984 | McAnlis et al. ............. 364/200 |

(List continued on next page.)

FOREIGN PATENT DOCUMENTS

| | | |
|---|---|---|
| 0164890 | 12/1985 | European Pat. Off. . |
| 58-72266 | 4/1983 | Japan . |
| 1-26086 | 5/1983 | Japan . |
| 59-33521 | 2/1984 | Japan . |
| 61-214042 | 9/1986 | Japan . |
| 2121971A | 1/1984 | United Kingdom . |

OTHER PUBLICATIONS

IBM Technical Disclosure Bulletin, vol. 27 No. 4A, Sep. 1984.
Toshiba Personal Computer T1100 Plus Owner's Manual, Toshiba Corporation Apr., 1986.
T1200 Portable Personal Computer User's Manual, Toshiba America, Inc., 1987.

(List continued on next page.)

*Primary Examiner*—Kevin A. Kriess
*Attorney, Agent, or Firm*—Finnegan, Henderson Farabow, Garrett & Dunner

[57] ABSTRACT

A power supply for use in a computer system according to this invention has a one-chip microcomputer having a built-in A/D converter. The microcomputer, which has a communication function, performs a power off sequence for a computer system and a power off sequence for a hard disk drive built in the computer system, while communicating with the computer system. Further, the microcomputer detects the voltage and current of a chargeable battery, discriminates a low battery state, monitors a power switch, a hard disk drive switch and a reset switch, and monitors an input/output voltage.

67 Claims, 6 Drawing Sheets

U.S. PATENT DOCUMENTS

| | | |
|---|---|---|
| 4,461,003 | 7/1984 | Tamaki . |
| 4,489,700 | 7/1989 | Morioka et al. . |
| 4,517,517 | 5/1985 | Kinney . |
| 4,559,497 | 12/1985 | Farrugia . |
| 4,564,798 | 1/1986 | Young . |
| 4,571,690 | 2/1986 | Munetsugu . |
| 4,593,349 | 6/1986 | Chase et al. .......................... 364/200 |
| 4,611,289 | 9/1986 | Coppola ............................. 364/200 |
| 4,618,779 | 10/1986 | WIscombe . |
| 4,633,418 | 12/1986 | Bishop . |
| 4,645,943 | 2/1987 | Smith, Jr. et al. . |
| 4,654,818 | 3/1987 | Wetterau, Jr. . |
| 4,660,027 | 4/1987 | Davis . |
| 4,674,031 | 6/1987 | Siska, Jr. . |
| 4,678,998 | 7/1987 | Muramatsu . |
| 4,707,795 | 11/1987 | Alber et al. . |
| 4,730,121 | 3/1988 | Lee et al. . |
| 4,737,702 | 4/1988 | Koenck . |
| 4,747,041 | 5/1988 | Engel et al. . |
| 4,754,160 | 6/1988 | Ely . |
| 4,768,162 | 8/1988 | Nishimura . |
| 4,782,355 | 11/1988 | Sakai et al. . |
| 4,792,743 | 12/1988 | Tsujino et al. . |
| 4,809,163 | 2/1989 | Hirosawa et al. . |
| 4,816,862 | 3/1989 | Taniguchi et al. . |
| 4,827,220 | 5/1989 | Figh . |
| 4,833,459 | 5/1989 | Geuer et al. . |
| 4,849,682 | 7/1989 | Bauer et al. . |
| 4,851,756 | 7/1989 | Schaller et al. . |
| 4,860,185 | 8/1989 | Brewer et al. . |
| 4,879,624 | 11/1989 | Jones et al. . |
| 4,907,150 | 3/1990 | Arroyo et al. . |
| 4,907,183 | 3/1990 | Tanaka . |
| 4,908,790 | 3/1990 | Little et al. . |
| 4,984,185 | 1/1991 | Saito . |
| 5,028,806 | 7/1991 | Stewart et al. . |
| 5,128,552 | 7/1992 | Fang et al. . |

OTHER PUBLICATIONS

Toshiba T1600 Portable Personal Computer User's Manual, Toshiba Corporation, 1988.

Patent Abstracts of Japan, vol. 10, No. 266 (P–496) (2322), Sep. 11, 1986, for JP-A-6191708 (Fanuc Ltd.) May 9, 1986.

Patent Abstracts of Japan, vol. 2, No. 106 (E–54) (5625), Aug. 31, 1978, for JP-A-537185 (Daini Seikosha K.K.), Jun. 26, 1978.

Schuman, D., "Step-by-Step Design Yields Battery Supply for Portable $\mu$C," 2119 E.D.N. Electrical Design News, vol. 28 (Sep. 1983), No. 19, pp. 197–208.

W. A. Lopour, et al., "System and I/O Device Power Control Using a Micro-Processor", IBM Technical Disclosure Bulletin, vol. 23, No. 5, New York, Oct. 1989, 2079–2082.

J. T. Eaton, et al., "Design of HP's Portable Computer Family", Hewlett Packard Journal, vol. 37, No. 7, Amstelveen, NL, Jul. 1986, 4–13.

"Method for Warning Users of a Low Battery Condition on a Battery-Powered Computer", IBM Technical Disclosure Bulletin, vol. 29, No. 6, New York, Nov. 1986, 2641–2643.

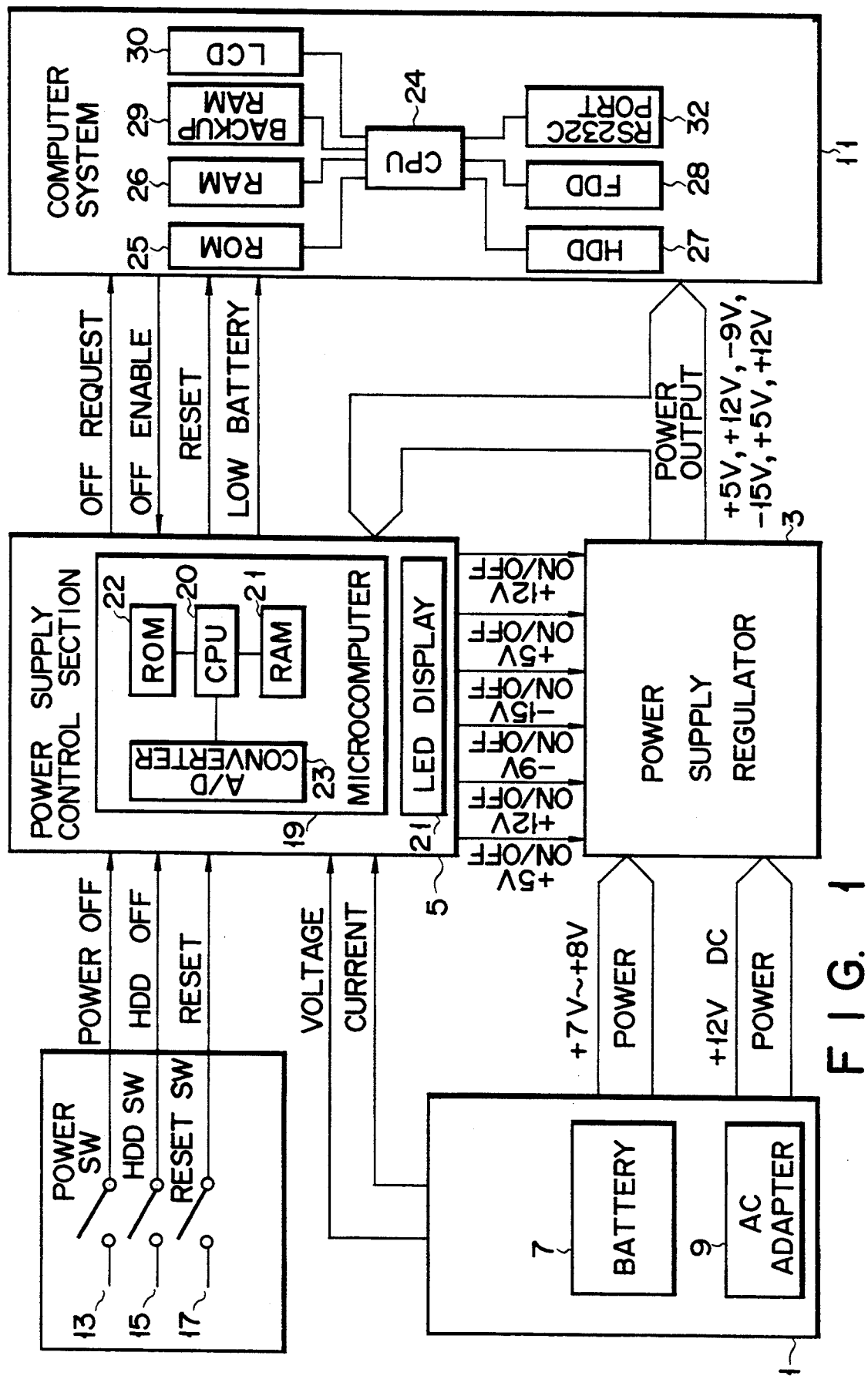
F I G. 1

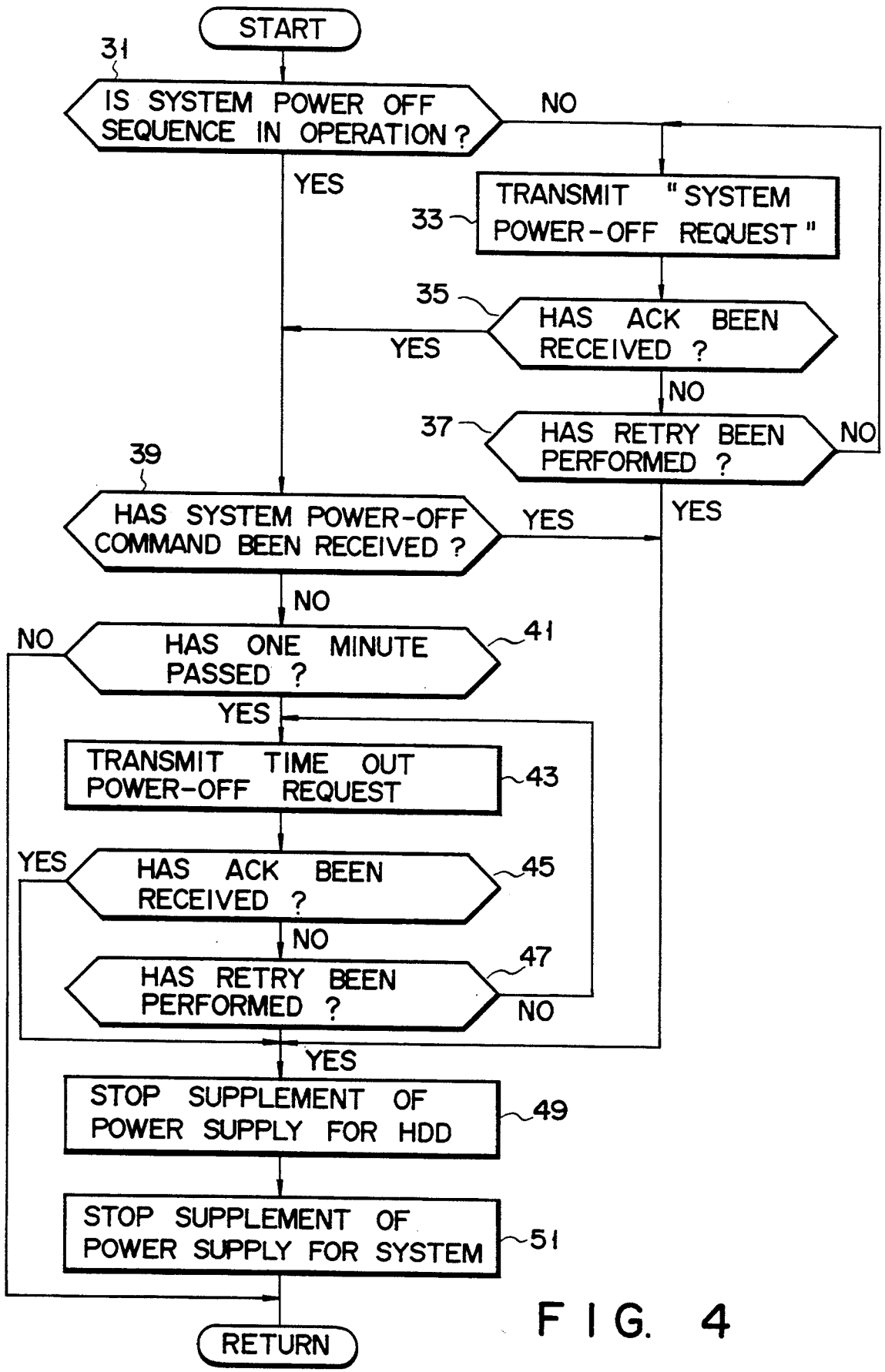
F I G. 4

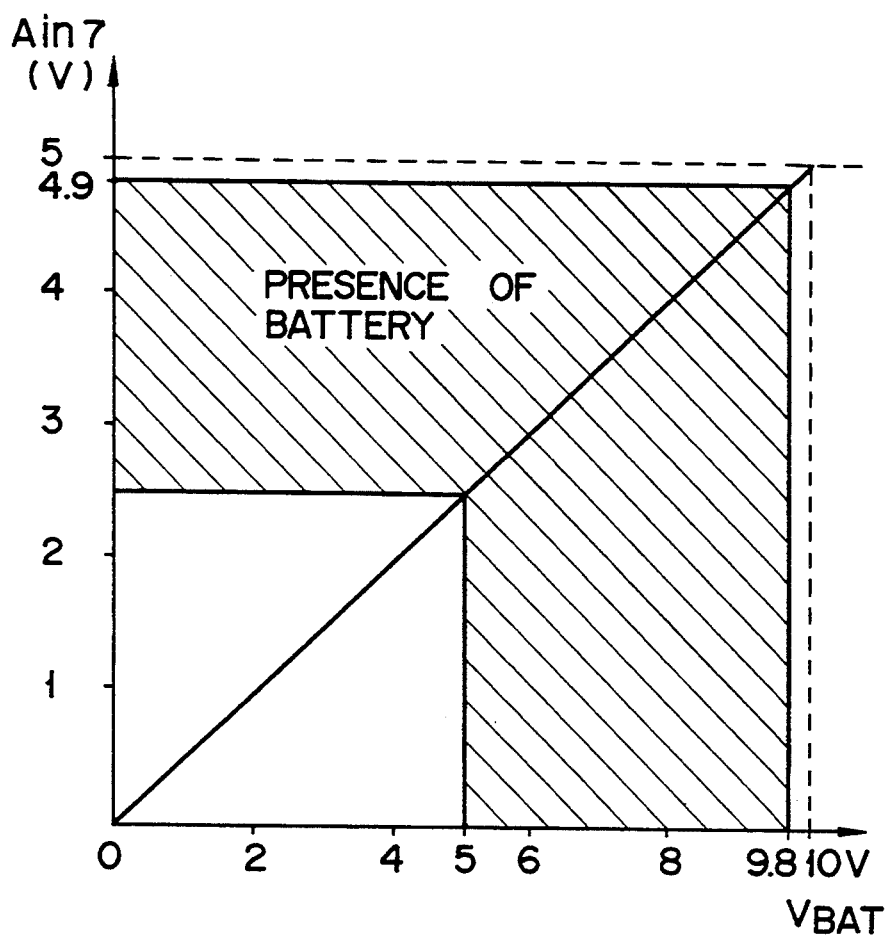
F I G. 7
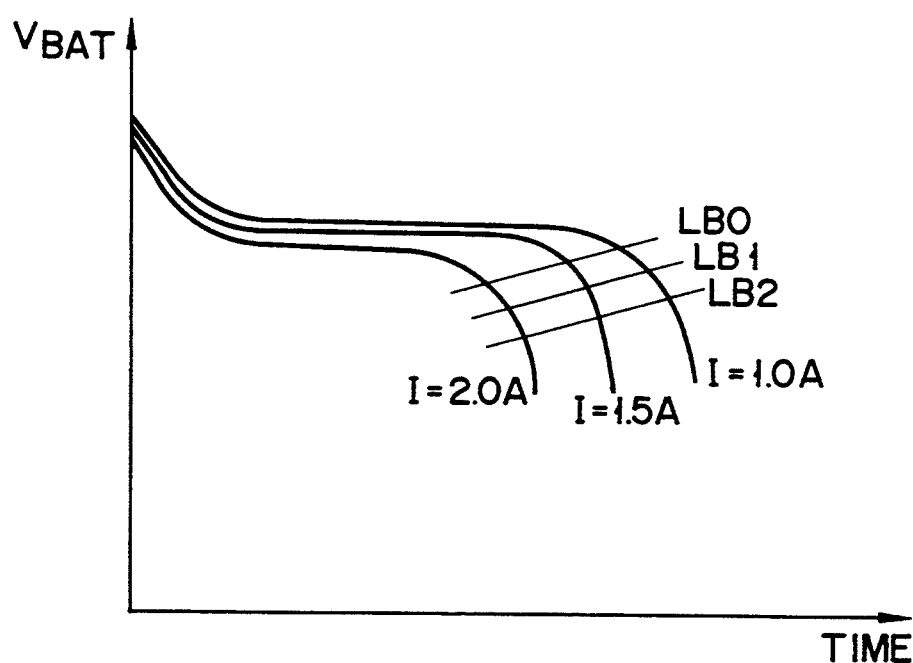
F I G. 8

POWER SUPPLY AND METHOD FOR USE IN A COMPUTER SYSTEM TO CONFIRM A SAVE OPERATION OF THE COMPUTER SYSTEM AND TO STOP A SUPPLY OF POWER TO THE COMPUTER SYSTEM AFTER CONFIRMATION

This application is a continuation under 37 CFR 1.62 of pending prior application Ser. No. 07/962,039 filed Oct. 15, 1992, which is a continuation of application Ser. No. 07/884,451 filed May, 14, 1992, which is a continuation of application Ser. No. 07/571,839 filed Aug. 23, 1990, which is a continuation of application Ser. No. 07/134,370 filed Dec. 17, 1987, all now abandoned.

BACKGROUND OF THE INVENTION

The present invention relates to a power supply with a built-in microcomputer for use in a computer system.

In general, when a power switch of a computer is turned off or the voltage of the computer's built-in battery decreases, a power off signal is sent to the computer from a power supply section and power supply to the computer is inhibited after a predetermined time. Within this predetermined time, the computer stops the current job and performs a save operation to save the contents of various registers, I/O statuses, memory contents, etc. so that it can start the interrupted job when powered again.

However, when the computer receives the power off signal while accessing an input/output (I/O) device, such as a disk drive that requires a long accessing time, the computer cannot perform the save operation until the access operation is completed. This is because when a recording-medium-driving motor of, for example, a hard disk drive is stopped while its head is accessing the recording medium rotating at a high speed, the head is likely to be crushed or damaged.

With the above restriction, therefore, the power supply would be stopped before the save operation is completed. As a result, when the power is supplied again to continue an interrupted program, the program may overrun.

In addition, detection of a low battery in a conventional battery-driven computer system is determined only by a battery voltage. With this method, however, when a load status changes, a low battery time cannot be accurately detected.

SUMMARY OF THE INVENTION

With the above in mind, therefore, it is an object of this invention to provide a power supply for use in a computer system, which has a microcomputer built therein so that it can confirm a save operation of the computer system by communicating with the computer system through the microcomputer and can stop the power supply to the system after the confirmation.

To achieve the above object, a power supply for use in a computer system of this invention comprises:

a power supply section constituted by at least one of a battery and an alternating current (AC) adapter;

a power control section, having a microcomputer and coupled to the power supply section and the computer system through a serial transmission path, for sending an externally-supplied power off request signal to the computer system and outputting a power off signal upon reception of a power-off acknowledge signal from the computer system; and a power output section, coupled to the power supply section and the power control section, for inhibiting power from the power supply section from being supplied to the computer system in response to the power off signal from the power control section.

According to this invention, information can be sent between a power supply and a computer system through a serial transmission, power supply to the computer system can be stopped after a save operation is assuredly performed even during a long accessing operation.

Further, according to this invention, even when power supply to the computer system is instructed, the power supply will be stopped after the contents of a program counter for a currently-running program, various registers and a memory and I/O statuses are written into a backup memory. This permits the interrupted program to continue when the computer system is powered again.

In addition, it is possible to perform a battery charge control and calculation o#the remaining battery power and detect a low battery (below a reference voltage) and a battery replacement, so that in response to a status request from the computer system, the requested information can be sent to the computer system through a serial transmission.

To stop power supply to a disk drive, a power off request signal for the disk drive is sent to the computer system and the power supply is stopped upon reception of a power-off acknowledge signal from the computer system. This can prevent the head of the disk drive from being crushed or damaged due to the power-off operation.

BRIEF DESCRIPTION OF THE DRAWINGS

Other objects and features of the present invention will be apparent from the following description taken in connection with the accompanying drawings, in which:

FIG. 1 is block diagram illustrating a power supply with a built-in microcomputer for use in a computer system, according to one embodiment of this invention;

FIG. 4 is a flowchart illustrating a control sequence among the sequences of FIG. 3, which is performed by the microcomputer built in the power supply control section;

FIG. 7 is a diagram illustrating a correlation between a battery voltage and an analog input voltage, used to detect a battery detachment; and FIG. 8 is a diagram illustrating discharge voltage curves used to detect a low battery.

DETAILED DESCRIPTION OF THE PREFERRED EMBODIMENTS

Figure 2:
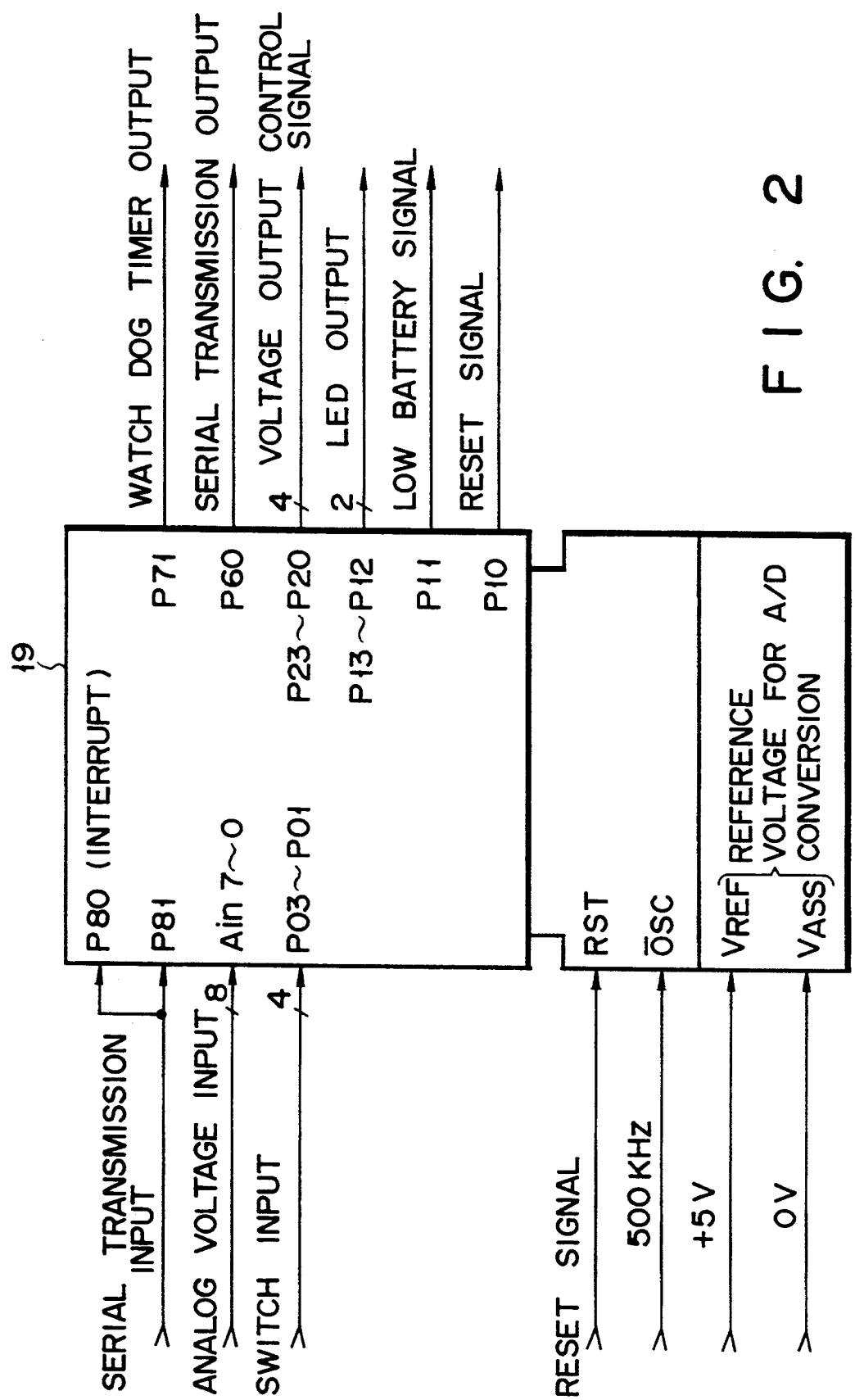
FIG. 2 is a diagram illustrating the microcomputer built in a power supply control section shown in FIG. 1.

FIG. 1 is a block diagram of a microcomputer-built-in power supply (hereinafter called intelligent power supply (IPS)) for use in a computer system according to this invention. This IPS comprises a power supply section 1, a power supply regulator 3 and a power supply control section 5. Power supply section 1 is constituted by a chargeable battery 7 (i.e., a nickel-cadmium battery) of a DC +7 to 8 V and an AC adapter 9 for converting an AC voltage (+120 V) to a DC voltage (+12 VDC). Power supply regulator 3 is coupled to outputs of power supply section 1 and supplies power of, for example, +5 V, +12 V, −9 V, −15 V, +5 V or +12 V to a computer system. Whether to output or stop outputting the individual power to the computer system is determined by control signals supplied to the regulator 3 for power supply control section 5.

Power supply control section 5 receives ON/OFF information from a power switch 13, a hard disk drive (HDD) switch 15 and a reset switch 17 provided on a computer system assembly 11, and checks the voltage and current of battery 7 and DC voltage of AC adapter 9. Power supply control section 5 also sends, to power supply regulator 3, control signals to indicate the power supply or inhibition of the power supply of the individual powers of +5 V, +12 V, −9 V, −15 V, +5 V and +12 V to computer system 11. The control section 5 further monitors various output voltages from power supply regulator 3 and outputs a power off signal to stop the power supply when any of the output voltages is out of a normal voltage range. In addition, in response to the ON/OFF request signals from power switch 13, HDD switch 15 and reset switch 17, power supply control section 5 outputs the ON/OFF request signals to power supply regulator 3 and outputs a reset signal to computer system 11. The power supply control section 5 has a built-in 4-bit one-chip microcomputer 19, which may be TMP47C440AF (a Toshiba product). This one-chip microcomputer 19 comprises a central processing unit (CPU) 20, a random access memory (RAM) 21 for storing data, a read only memory (ROM) 22 for storing a control program and an analog-to-digital (A/D) converter 23 for converting an analog input voltage to a digital voltage.

The one-chip microcomputer need not to be provided with the A/D converter if it is externally coupled to such an A/D converter. A/D converter 23 may have an 8-channel analog input terminal so as to equally divide an input analog voltage into 255 sections.

Computer system 11 is a battery-driven lap top type personal computer, which comprises a central processing unit (CPU) 24 of 8 bits, a ROM 25 for storing a control program to control CPU 24, a RAM 26 for storing data, etc., a 3.5-inch HDD drive 27 serving as a high speed external memory device, a 3.5-inch floppy disk drive 28, a backup memory 29 for storing data that should be saved at the time of a save operation, a liquid display 30 and an RS232C port 32. As shown in FIG. 2, microcomputer 19 has a serial transmission input terminal P81 for receiving transmission data from computer system 11. The serial transmission data is also supplied to an interrupt terminal P80, so that when serial transmission data is sent from computer system 11, microcomputer 19 is interrupted and a serial transmission program stored in ROM 22 is executed. Along input terminals Ain7-0 are of an 8-channel type and receive various input voltages from battery 7, AC adapter 9, etc. More specifically, analog input terminals Ain0 to Ain7 are respectively supplied with an input voltage Vin (+12 V) from AC adapter 9, an output voltage $V_{CC}$(+5 V) for computer system 11, an output voltage $V_{RAM}$(+5 V) for backup RAM 29, an output voltage $V_{DD}$ (+12 V) for RS232C port 32, an output voltage $V_{EE}$ (−9 V) for RS232C port 32, an output voltage $V_{LCD}$(−15 V) for LCD 30, a battery voltage $V_{BAT}$ and a battery current $I_{BAT}$.

Switch input terminals P03-P01 are of a 4-channel type and receive ON/OFF information from power switch 13, HDD switch 15 and reset switch 17. Microcomputer further has a reset signal input terminal RST for receiving a reset signal from computer system 11, a clock signal input terminal OSC for receiving a clock signal of 500 KHz and input terminals $V_{REF}$ and $V_{ASS}$ for receiving +5 V and 0 V voltages as A/D conversion reference voltages. The microcomputer 19 has on its output side a watch dog timer output terminal, a serial transmission output terminal, voltage output controls, an LED output terminal, a low battery signal output terminal and a reset signal output terminal.

Power supply control section 5 further comprises an LED display 21, which is constituted by two color (red and green) LEDs. When the red light is ON, it means that battery 7 is being charged. When the green light is ON, it means that AC adapter 9 is used or charging battery 7 is completed. When the red light is flickering, it indicates an abnormality in the input voltage of AC adapter 9 or the output voltage at the power-on time or an abnormal completion of a self test of the power supply. When the green light is flickering, it indicates a normal completion of the self test.

The control program for CPU 20, stored in ROM 22, performs the following functions.

i) Switch Monitoring

To detect the ON and OFF states of power switch 13, HDD switch 15 and reset switch 17.

ii) Voltage Monitoring

To detect the output voltage and output current of battery 7, the output voltage of AC adapter 9 and various types of output voltages.

iii) To perform a serial input/output control for communication with computer system 11.

iv) To control the lightening of the red and green LEDs as a control for LED display 21.

v) To perform the output control of various voltages supplied to computer system 11 from power supply regulator 3 and the output control of the reset signal and low battery signal to computer system 11.

vi) Power Supply Stop Control

To perform the controls of a HDD power-off sequence, a system power off and a low battery power off. (These controls will be described later.)

vii) Charge Control

To perform the measurement of a charging time of battery 7, calculation of a charged capacitance and remaining capacitance, discrimination of completion of the charging and control of the start and end of the charging operation.

viii) To discriminate low battery 0, 1 or 2 in detecting the low battery. (The low batteries 0, 1 and 2 will be described later.)

ix) To start the self test as a control for self-diagnosis and display the result of the test.

Transmission between the IPS and the computer system is carried out using two signal lines, one for sending and the other for reception, in a 512 bps/s serial non-synchronous mode. The format for data transmission is such that each unit data is sent with 1 start bit, 8 data bits and 1 stop bit, mounting to 10 bits. When an interrupt signal is input to the input terminal P80 of the microcomputer as shown in FIG. 2, a reception routine starts.

The following are the commands sent between the IPS and computer system 11 and their functions.

1. Commands from IPS to Computer System and Their Functions (1) System Power Off Request Generated upon detection of the off state of power switch 13.

(2) Low Battery Off Request

Generated upon detection of the low battery signal.

(3) HDD Power Off Request

Generated upon detection of the off state of HDD switch 15.

(4) Battery Status

To inform computer system 11 of the remaining capacitance of battery 7 in 8 levels to computer system 11.

(5) IPS Status-1

To inform computer system 11 of an abnormal output of a DC voltage (excess output or insufficient output) and an abnormal input of the AC adapter (excess input or insufficient input).

(6) IPS Status-2

To inform computer system 11 of the types of abnormal DC outputs ( i.e., VCC, VRAM, VDD and VLCD).

(7) ACK

A command to inform a signal reception completed.

(8) Time Out Power Off Command Generated at the time-out.

2. Commands from Computer System to IPS (1) System Power Off Command

To permit power off.

(2) HDD Power Off Command

To permit or request HDD power off.

(3) HDD Power On Command

To request HDD power on.

(4) Battery Status Read Request

To request the status of the remaining capacitance of the battery.

(5) Battery Status Set Command

To set the remaining capacitance of the battery in 8 levels. (Since the battery is replaceable and the IPS does not know the remaining power of a replaced battery, a user can set 8 levels of the remaining capacitance including "full" and "empty.")

(6) IPS Status-1 Read

To request reading of the IPS Status-1 (abnormal state).

(7) IPS Status-2 Read

To request reading of the IPS Status-2 (abnormal type).

(8) Test Start

To start the self test.

(9) ACK

To inform a signal reception completed.

Figure 3:
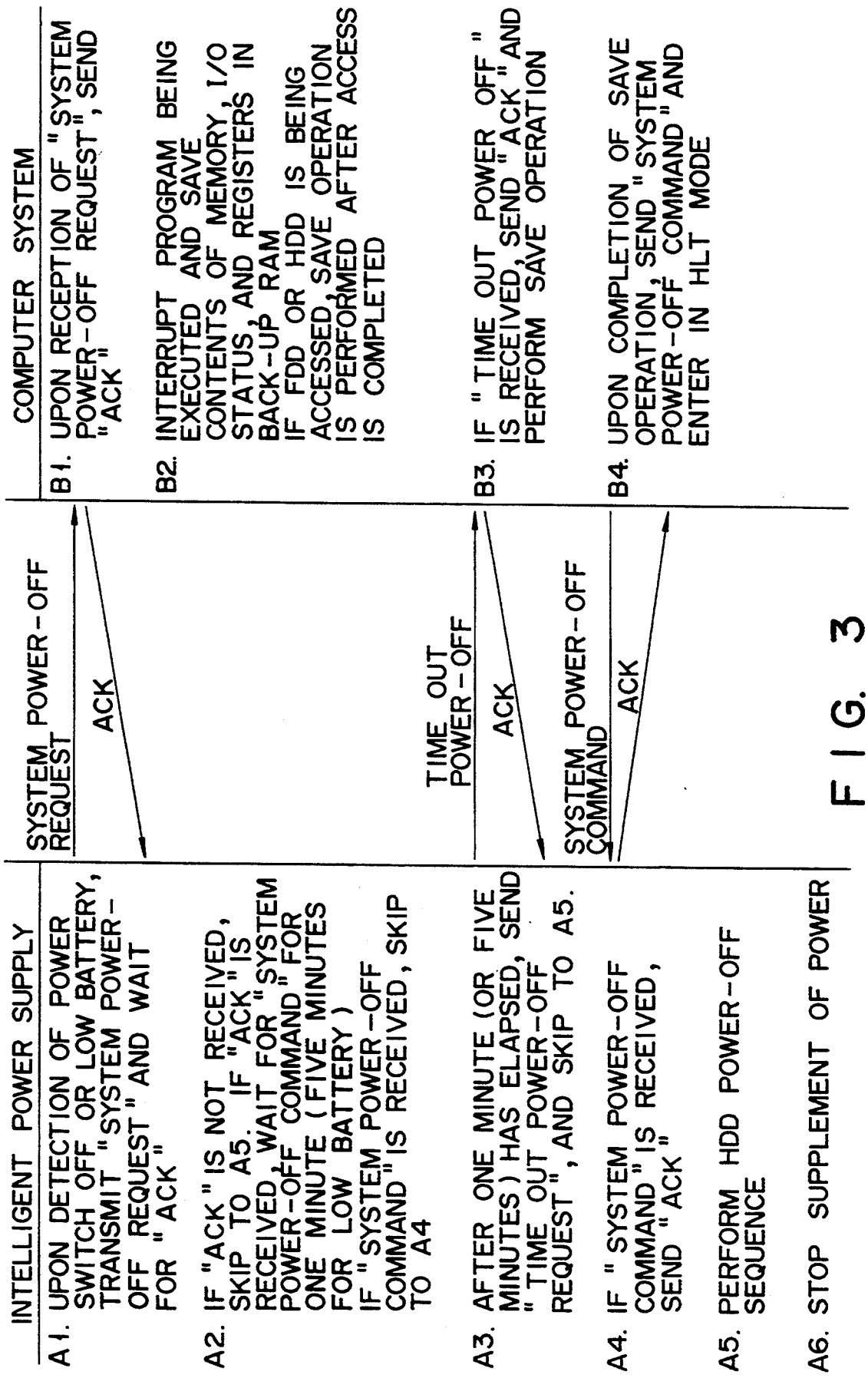
FIG. 3 is a conceptual diagram of sequences conducted between the power supply of this invention and a computer system.

The system power off sequence will now be explained referring to FIGS. 3 and 4. As shown in FIG. 3, upon detection of the off state of power switch 13 or the low battery signal of battery 7, the IPS sends the "System Power Off Request" to computer system 11. In response to this request signal, computer system 11 returns the "ACK" to the IPS. When the "ACK" does not return to the IPS, the IPS discriminates that some kind of abnormality, such as a program overrun, has occurred on the computer system side, and performs the HDD power off sequence to protect HDD 27. HDD 27 is generally driven at a high speed, so that abrupt turning off of the motor of HDD 27 may crash the head. Therefore, the motor should be stopped after the head is retracted to a shipping zone.

HDD 27 assembled in computer system 11 has a function to automatically move the head to the shipping zone when the +12 V power for the motor, one of three types of powers (+12 V and +5 V for the motor and +5 V for the circuitry) supplied to HDD 27, is turned off first. The IPS turns the $V_{CCM}$ (+5 V) off and, after, for example, 3 seconds, turns the $V_{CCM}$ (+5 V) and $V_{CCL}$ (+5 V) off. This can ensure the retraction of the head.

Upon reception of the "ACK," the IPS waits for the "System Power Off Command" from computer system 11 for one minute (five minutes in the case of low battery).

When receiving the "System Power Off Request" from the IPS and returning the "ACK" thereto, computer system 11 interrupts the currently-running program and saves the content of memory 26, the I/O statuses, the contents of the registers, etc. into backup RAM 29 (with a memory capacity of, for example, 16K bytes), which is provided on the computer system side. At this time, when FDD 28 or HDD 27 is being accessed, the save operation is performed after an access end is reached (Resume Function).

When the IPS waits one minute (or five minutes) yet does not receive the "System Power Off Command" from computer system 11, it sends the "Time Out Power Off Request" to computer system 11 and performs the HDD power off sequence.

Upon reception of the "Time Out Power Off Command," computer system 11 returns the "ACK" to the IPS and performs the save operation as much as possible during several scores of milliseconds in which the power is turned off. When the save operation is completed, computer system 11 returns the "System Power Off Command" to the IPS and enters a halt (HLT) mode.

Upon reception of the "System Power Off Command," the IPS returns the "ACK" to computer system 11, per-forms the HDD power off sequence and then stops the power supply.

The operation of microcomputer 19 built in power supply control section 5 will now be explained referring to the flowchart of FIG. 4.

First, in step 31, microcomputer 19 determines whether or not the IPS is performing the system power off sequence. If the determination in step 31 is NO, the "System Power Off Request" is sent to computer system 11 in step 33. In the next step 35, microcomputer 19 determines whether or not the "ACK" is sent from the computer system, and, if NO in step 35, determines whether or not the retry is performed in step 37. If no retry has been performed, steps 33 and 35 are repeated.

If it is determined in step 31 that the system power off sequence is running and is determined in step 35 that the "ACK" is returned from computer system 11, the process advances to step 39 where microcomputer 19 determines whether or not the "System Power Off Command" from computer system 11 is received. If the determination in step 39 is NO, it is determined whether or not one minute has elapsed in step 41. If one minute has not been elapsed, microcomputer exits this routine. On the other hand, if it is determined in step 41 that one minute has been elapsed, the "Time Out Power Off Request" is sent to computer system 11 in step 43. Microcomputer then determines in step 45 whether or not the "ACK" is sent from computer system 11. If the determination is NO in step 45, it is then determined in step 47 whether or not the retry has been performed. If no retry has been performed yet, steps 43 and 45 are repeated. On the other hand, if it is determined in step 45 that the "ACK" is received and is determined in step 47 that the retry has been performed, the process advances to step 49 where the power supply to HDD 27 is stopped. And in the next step 51, the power supply to computer system 11 is stopped.

The switch monitoring function of power supply control section 5 will now be explained. Power supply control section 5 always monitors power switch 13, HDD switch 15 and reset switch 17 and checks if their switching states have changed. When a change in the switching states occurs, the control section 5 waits, for example, 66 msec to prevent a chattering. Upon elapse of 66 msec, power supply control section 5 checks the switching states again for any change. If the change is detected, a flag for the switch whose state has changed is set and the switching state is recorded.

The charge control function will be explained below.

The charged capacitance (CC) and remaining capacitance (RC) of battery 7 are calculated as follows. Provided that the current flowing in and out from the battery is denoted by I ($-1A \leq I \leq 4A$), the charged capacitance and remaining capacitance can be calculated by the following equations.

i) When $-1 \leq I < 0$ or charging is performed,
CC = $-f$Idt
RC = $-\frac{2}{3} \times f$Idt.

From the above, therefore, CC=CC+|ΔI|, and RC=RC+$\frac{2}{3}$|ΔI|, where ΔI is a value sampled for every second.

ii) when $0 \leq I \leq 4[A]$ or discharging is performed,
CC=0
RC=RC−$f$Idt.

From the above, therefore, CC=0 and RC=RC−|ΔI|.

The charge completion control will now be discussed. The IPS detects the completion of the charging operation from three values: the battery voltage ($V_{BAT}$), charged capacitance (CC) and charging time (CT).

Figure 5:
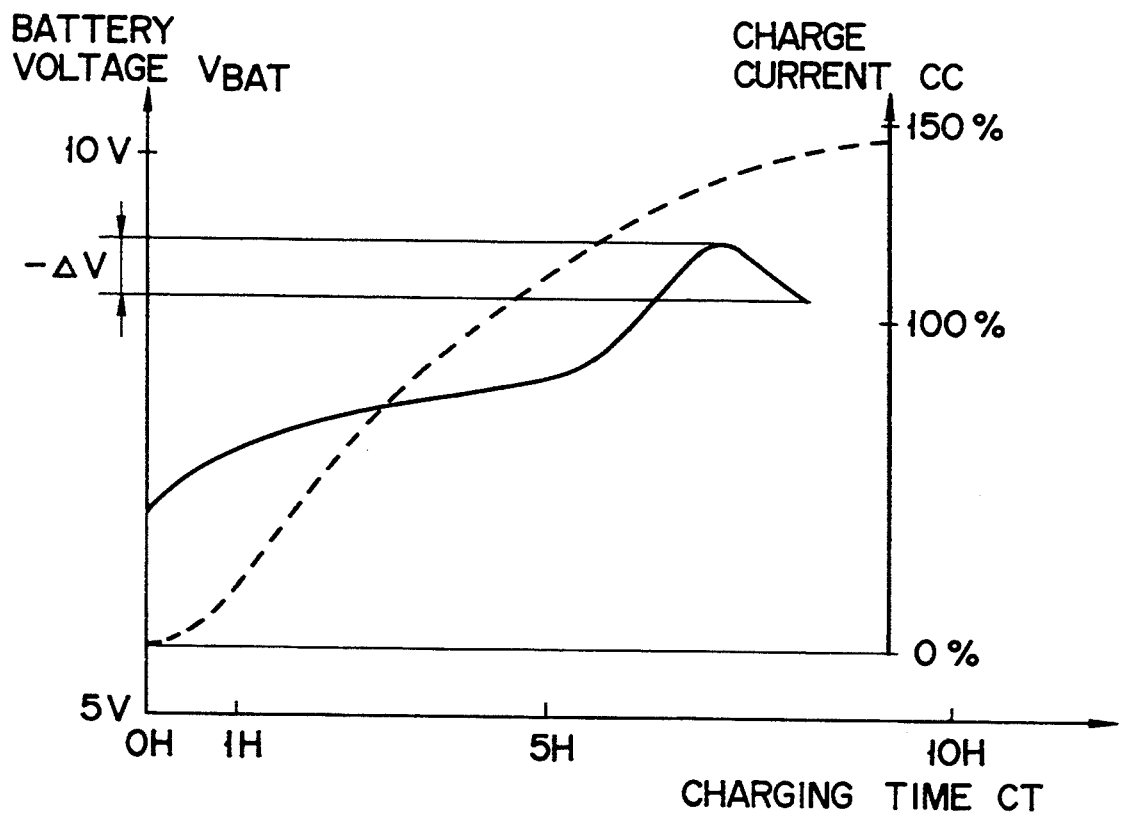
FIG. 5: is a diagram illustrating a characteristic with a battery voltage vs. a charging time for explaining a charge control.

FIG. 5 is a graph illustrating the relationship between a charged capacitance and a battery voltage, with the horizontal scale representing the charging time and the vertical scale representing the battery voltage. In the drawing, the solid line indicates the battery voltage and the broken line indicates the charged capacitance. As illustrated in FIG. 5, during an about one hour period after the charging has started, the charging completion will not be checked because the chemical reaction in the battery during this period is not stable. After one hour period after the start of the charging, the end of the charging is repeatedly checked in the following sequence.

i) It is considered that the charging is completed when the battery voltage ($V_{BAT}$) drops from the peak value by a given value ($-\Delta V$).

ii) It is considered that the charging is completed when the charged capacitance (CC) becomes 150%, provided that the nominal capacitance of the battery being 100%.

iii) The charging is considered to be completed when the charging time exceeds 10 hours.

Upon detection of the completion of the charging, the IPS stops the charging operation, sets the nominal capacitance to the remaining capacitance (RC), and changes the color LED from the red LED to the green one. The above process can prevent an excess charging thus preventing the battery life from being shortened.

The chargeable battery is detachable. Therefore, it is necessary to detect the detachable state of the battery in order to control the charging operation and calculate the accurate battery capacitance. The relationship between the battery voltage $V_{BAT}$ and the analog input voltage of microcomputer 19 is given as follows:

| Battery Status | Battery Present | No Battery |
|---|---|---|
| AC adapter in use AC adapter input present | $V_{BAT} < 9.8$ [V] | $9.8$ [V] $\leq V_{BAT}$ |
| No AC adapter input | $5$ V $< V_{BAT} < 9.8$ [V] | |

Figure 6:
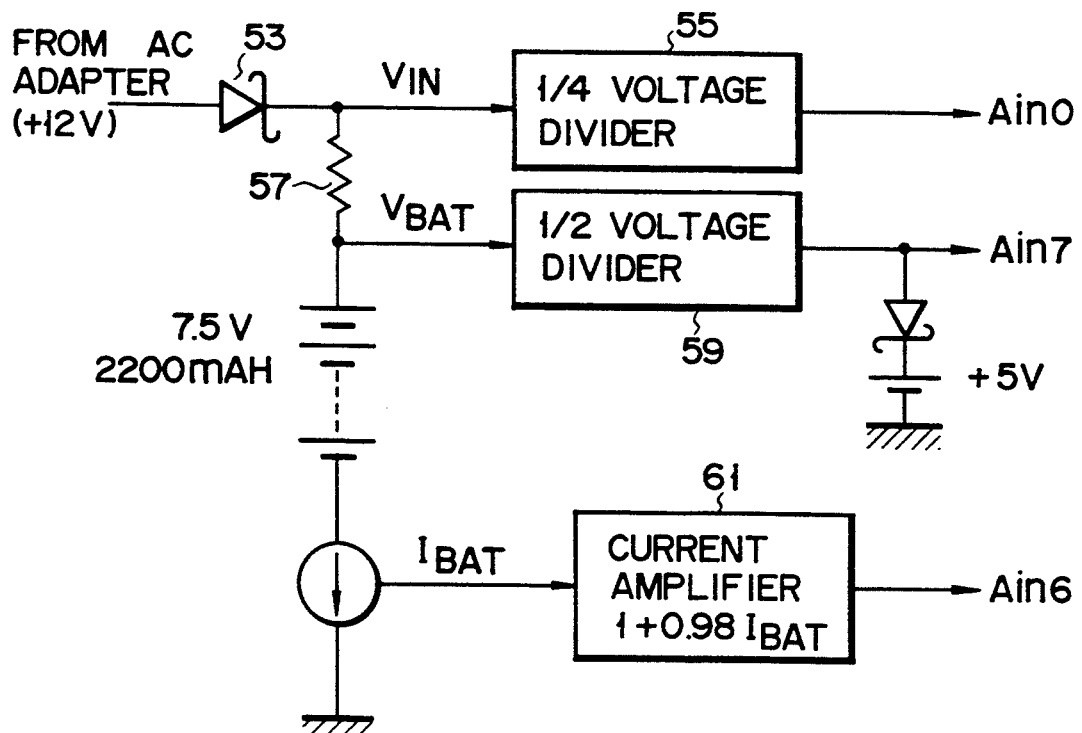
FIG. 6 is a circuit diagram exemplifying a battery monitoring circuit.

FIG. 6 illustrates an example of a battery monitoring circuit built in power supply section 1. As shown in FIG. 6, an input voltage of +12 V is input from AC adapter 9 to a ¼ voltage divider 55 through a Zener diode 53. The ¼ voltage divider 55 divides the input voltage Vin into ¼ and supplies the resultant voltage to analog input terminal Ain0 of microcomputer 19. The voltage from AC adapter 9 is also reduced through a resistor 57 to $V_{BAT}$ which is input to a ½ voltage divider 59. The ½ voltage divider 59 divides the battery voltage into ½ and supplies the resultant voltage to analog input terminal Ain7 of microcomputer 19. In addition, the battery current $I_{BAT}$ is supplied to a current amplifier 61 from a current source with 7.5 V/220 mAH. The output of current amplifier 61 is supplied to analog input terminal Ain6 of microcomputer 19.

FIG. 7 illustrates the relationship between the battery voltage and the terminal voltage supplied to analog input terminal Ain7 of microcomputer 19. When the battery voltage and the analog input voltage lie in the shaded region in FIG. 7, it is considered that the battery is present.

The detection of the low battery will now be explained. According to conventional personal computers, the low battery detection is determined only by the battery voltage. This method presents a problem that the low battery time cannot be accurately detected if a load status is changed. According to the IPS of the present invention, microcomputer 19 changes the voltage value for detecting the low battery in accordance with the current flowing from battery 7, so as to ensure accurate low battery detection.

FIG. 8 illustrates discharging voltage curves. In this drawing, the time is taken on the abscissa while the battery voltage is taken on the ordinate. As should be clear from FIG. 8, the low battery detection is performed in three stages from LB0 to LB2. In the LB0 (low battery 0) stage, the low battery indicator flickers. In the LB1 (low battery 1) stage, the system power off sequence is performed, and in the LB2 (low battery 2) stage, the power supply is stopped (no power off sequence).

What is claimed is:

1. A power supply system for use in a computer comprising:
   a power supply section comprising any of a battery and an AC adapter, said power supply section having an output voltage;
   a power output section coupled to said power supply section and including coupling means for supplying power from said power supply section to said computer system, and means, responsive to a power off signal, for inhibiting the supply of all power to said computer system; and a power control section having coupling means for connecting said power control section to said computer system through a serial transmission path, means including a microcomputer for detecting a degradation of said power supply section output voltage indicative of impending power failure, for receiving an externally-supplied power off request signal and subsequently transmitting a system power off request signal through said serial transmission path to command a save operation to be performed by said computer system, and for receiving an acknowledgment signal through said serial transmission path to confirm the completion of said save operation, means for transmitting said power off signal to said power output section to inhibit the supply of power through said power output section after receipt of said acknowledgment signal, a low batter display section, means for monitoring a voltage and a current of said battery, changing a reference voltage value in accordance with a detected current value, comparing a detected voltage value with said reference voltage value and causing said low battery display section to indicate a low battery when said detected voltage value is below said reference voltage value, and means for dividing a level of said low battery into first through third sub-levels in accordance with said detected current value, causing said low battery display section to indicate said low battery upon detection of said first sub-level, sending said power off request signal to said computer system upon detection of said second sub-level, and outputting said power off signal to said power output section.

2. The power supply system according to claim 1, wherein said power output section includes means for supplying power to said battery for a charging operation, and wherein said power control section includes a charge completion display section, means for calculating a charged capacitance and a remaining capacitance of said battery and a charging time based on a value of a current flowing from said battery, means for determining the completion of charging said battery from said calculated charged capacitance, remaining capacitance and charging time, and means for causing said charge completion display section to indicate said completion of charging.

3. The power supply system according to claim 1, wherein said power output section includes an AC adapter input voltage display section, means for detecting an input voltage of said AC adapter, and means for causing said AC adapter input voltage display section to indicate a voltage abnormality when said voltage abnormality occurs.

4. The power supply system according to claim 1, wherein said power output section includes power switch means for indicating ON/OFF modes of power supply to a computer system assembly, disk switch means for indicating ON/OFF modes of power supply to a disk drive, and reset switch means for indicating a system initialization, and wherein said power control section includes means for detecting an ON or OFF signal from said power switch, disk switch and reset switch, and means for outputting a signal to either supply power or inhibit the supply of power to said power output section.

5. The power supply system according to claim 1, wherein said power control section includes analog-to-digital converter means for converting voltage values and current values from said battery and said AC adapter into digital values.

6. The power supply system according to claim 1, wherein said computer system is a small size personal computer.

7. The power supply system according to claim 1, wherein said externally-supplied power off request signal is sent to said computer system when a power provided on said computer system is turned off.

8. The power supply system according to claim 1, wherein said externally-supplied power off request signal is sent to said computer system when a disk drive switch provided on said computer system is turned off.

9. The power supply system according to claim 1, wherein said externally-supplied power off request signal is sent to said computer system when power of said battery is below a predetermined value.

10. The power supply system according to claim 1, wherein said power control section includes means for informing said computer system of a battery's remaining capacitance in response to a battery remaining capacitance check request from said computer system.

11. A method for cutting off a supply of power by a power supply system for use in a computer, the power supply system including a power supply section comprising any of a battery and an AC adapter, said power supply section having an output voltage, and a power output section coupled to said power supply section, said power output section having a coupling for supplying power from said power supply section to said computer system and being responsive to a power off signal to inhibit the supply of all power to said computer system, the method comprising the steps of:

monitoring a voltage and a current of said battery;

changing a reference voltage value in accordance with a detected current value;

comparing a detected voltage value with said reference voltage value and causing a low battery display section to indicate a low battery when said detected voltage value is below said reference voltage value, the comparing step including the steps of dividing a level of said low battery into first through third sub-levels in accordance with said detected current value, causing said low battery display section to indicate said low battery upon detection of said first sub-level, sending a power off request signal to said computer system upon detection of said second sub-level, and outputting said power off signal to said power output section;

receiving an externally-supplied power off request signal and subsequently transmitting a system power off request signal through said serial transmission path to command a save operation to be performed by said computer system;

receiving an acknowledgment signal through said serial transmission path to confirm the completion of said save operation; and transmitting said power off signal to said power output section to inhibit the supply of power through said power output section after receipt of said acknowledgment signal.

12. A power supply system for use in a computer having a main memory, registers and a battery backed-up random access memory (RAM), comprising:

a power supply section comprising any of a battery and an AC adapter, said power supply section having an output voltage;

a power output section coupled to said power supply section and including coupling means for supplying power from said power supply section to said computer system, and means, responsive to a power off signal, for inhibiting the supply of all power to said computer system; and a power control section having coupling means for connecting said power control system through a serial transmission path, means including a microcomputer for detecting a degradation of said power supply section output voltage indicative of impending power failure, for receiving an externally-supplied power off request signal and subsequently transmitting a system power off request signal through said serial transmission path to command a save operation to be performed by said computer system, the computer system saving at least contents of the main memory and the registers into the battery backed-up RAM in response to the system power off request signal, and for receiving an acknowledgment signal through said serial transmission path to confirm the completion of said save operation, and means for transmitting said power off signal to said power output section to inhibit the supply of power through said power output section after receipt of said acknowledgment signal.

13. The power supply system according to claim 12, wherein said power output section includes means for supplying power to said battery for a charging operation, and wherein said power control section includes a charge completion display section, means for calculating a charged capacitance and a remaining capacitance of said battery and a charging time based on a value of a current flowing from said battery, means for determining the completion of charging said battery from said calculated charged capacitance, remaining capacitance and charging time, and means for causing said charge completion display section to indicate said completion of charging.

14. The power supply system according to claim 12, wherein said power output section includes an AC adapter input voltage display section, means for detecting an input voltage of said AC adapter, and means for causing said AC adapter input voltage display section to indicate a voltage abnormality when said voltage abnormality occurs.

15. The power supply system according to claim 12, wherein said computer system includes power switch means for indicating ON/OFF modes of power supply to a computer system assembly, disk switch means for indicating ON/OFF modes of power supply to a disk drive, and reset switch means for indicating a system initialization, and wherein said power control section includes means for detecting an ON or OFF signal from said power switch, disk switch and reset switch, and means for outputting a signal to either supply power or inhibit the supply of power to said power output section.

16. The power supply system according to claim 12, wherein said power control section includes analog-to-digital converter means for converting voltage values and current values from said battery and said AC adapter into digital values.

17. The power supply system according to claim 12, wherein said computer system is a small size personal computer.

18. The power supply system according to claim 12, wherein said externally-supplied power off request signal is sent to said computer system when a power provided on said computer system is turned off.

19. The power supply system according to claim 12, wherein said externally-supplied power off request signal is sent to said computer system when a disk drive switch provided on said computer system is turned off.

20. The power supply system according to claim 12, wherein said externally-supplied power off request signal is sent to said computer system when power of said battery is below a predetermined value.

21. The power supply system according to claim 12, wherein said power control section includes means for informing said computer system of a battery's remaining capacitance in response to a battery remaining capacitance check request from said computer system.

22. A power supply system for use in a computer having a disk drive, comprising:

a power supply section comprising any of a battery and an AC adapter, said power supply section having an output voltage;

a power output section coupled to said power supply section and including coupling means for supplying power from said power supply section to said computer system, and means, responsive to a power off signal, for inhibiting the supply of all power to said computer system; and a power control section having coupling means for connecting said power control section to said computer system through a serial transmission path, means including a microcomputer for detecting a degradation of said power supply section output voltage indicative of impending power failure, for receiving an externally-supplied power off request signal and subsequently transmitting a system power off request signal through said serial transmission path to command a save operation to be performed by said computer system, and for receiving an acknowledgment signal through said serial transmission path to confirm the completion of said save operation, means for transmitting said power off signal to said power output section to inhibit the supply of power through said power output section after receipt of said acknowledgment signal, and means for performing a disk drive power off sequence if said receiving means receives no acknowledgment signal during a predetermined period of time.

23. The power supply system according to claim 22, wherein said power output section includes means for supplying power to said battery for a charging operation, and wherein said power control section includes a charge completion display section, means for calculating a charged capacitance and a remaining capacitance of said battery and a charging time based on a value of a current flowing from said battery, means for determining the completion of charging said battery from said calculated charged capacitance, remaining capacitance and charging time, and means for causing said charge completion display section to indicate said completion of charging.

24. The power supply system according to claim 22, wherein said power output section includes an AC adapter input voltage display section, means for detecting an input voltage of said AC adapter, and means for causing said AC adapter input voltage display section to indicate a voltage abnormality when said voltage abnormality occurs.

25. The power supply system according to claim 22, wherein said computer system includes power switch means for indicating ON/OFF modes of power supply to a computer system assembly, disk switch means for indicating ON/OFF modes of power supply to a disk drive, and reset switch means for indicating a system initialization, and wherein said power control section includes means for detecting an ON or OFF signal from said power switch, disk switch and reset switch, and means for outputting a signal to either supply power or inhibit the supply of power to said power output section.

26. The power supply system according to claim 22, wherein said power control section includes analog-to-digital converter means for converting voltage values and current values from said battery and said AC adapter into digital values.

27. The power supply system according to claim 22, wherein said computer system is a small size personal computer.

28. The power supply system according to claim 22, wherein said system power off request signal is sent to said computer system when a power provided on said computer system is turned off.

29. The power supply system according to claim 22, wherein said system power off request signal is sent to said computer system when a disk drive switch provided on said computer system is turned off.

30. The power supply system according to claim 22, wherein said externally-supplied power off request signal is sent to said computer system when power of said battery is below a predetermined value.

31. The power supply system according to claim 22, wherein said power control section includes means for informing said computer system of a battery's remaining capacitance in response to a battery remaining capacitance check request from said computer system.

32. A power supply system for use in a computer comprising:

a power supply section comprising any of a battery and an AC adapter, said power supply section having an output voltage;

a power output section coupled to said power supply section and including coupling means for supplying power from said power supply section to said computer system, and means, responsive to a power off signal, for inhibiting the supply of all power to said computer system; and a power control section including means including a microcomputer for charging the battery and for detecting completion of a charge operation when any of the following conditions is satisfied:

when the battery voltage drops from a peak value by a given value;

when a charged capacitance of the battery becomes 150%, provided that a nominal capacitance of the battery is 100%; and when a charging time of the battery exceeds 10 hours.

33. The power supply system according to claim 32, wherein said power output section includes means for supplying power to said battery for a charging operation, and wherein said power control section includes a charge completion display section, means for calculating a charged capacitance and a remaining capacitance of said battery and a charging time based on a value of a current flowing from said battery, means for determining the completion of charging said battery from said calculated charged capacitance, remaining capacitance and charging time, and means for causing said charge completion display section to indicate said completion of charging.

34. The power supply system according to claim 32, wherein said power control section includes an AC adapter input voltage display section, means for detecting an input voltage of said AC adapter, and means for causing said AC adapter input voltage display section to indicate a voltage abnormality when said voltage abnormality occurs.

35. The power supply system according to claim 32, wherein said computer system includes power switch means for indicating ON/OFF modes of power supply to a computer system assembly, disk switch means for indicating ON/OFF modes of power supply to a disk drive, and reset switch means for indicating a system initialization, and wherein said power control section includes means for detecting an ON or OFF signal from said power switch, disk switch and reset switch, and means for outputting a signal to either supply power or inhibit the supply of power to said power output section.

36. The power supply system according to claim 32, wherein said power control section includes analog-to-digital converter means for converting voltage values and current values from said battery and said AC adapter into digital values.

37. The power supply system according to claim 32, wherein said computer system is a small size personal computer.

38. The power supply system according to claim 32, wherein an externally-supplied power off request signal is sent to said computer system when a power provided on said computer system is turned off.

39. The power supply system according to claim 32, wherein an externally-supplied power off request signal is sent to said computer system when a disk drive switch provided on said computer system is turned off.

40. The power supply system according to claim 32, wherein an externally-supplied power off request signal is sent to said computer system when power of said battery is below a predetermined value.

41. The power supply system according to claim 32, wherein said power control section includes means for informing said computer system of a battery's remaining capacitance in response to a battery remaining capacitance check request from said computer system.

42. The power supply system according to claim 41, wherein said power control section includes means for detecting the completion of the charge operation after a predetermined period of time has elapsed from the charging operation.

43. A power supply system for use in a computer comprising:
 a power supply section comprising any of a battery and an AC adapter, said power supply section having an output voltage;
 a power output section coupled to said power supply section and including
  coupling means for supplying power from said power supply section to said computer system, and
  means, responsive to a power off signal, for inhibiting the supply of all power to said computer system; and
 a power control section including
  controller means for automatically detecting a presence or absence of the AC adapter and the battery from a first reference voltage representing a driving voltage of the controller means, a second reference voltage representing a maximum voltage of the battery, and an analog input voltage input to the power control section such that the presence of both the AC adapter and the battery are detected when the analog input voltage is less than the second reference voltage, the absence of the AC adapter and the presence of the battery are detected when the analog input voltage is between the first reference voltage and the second reference voltage, and the presence of the AC adapter and the absence of the battery are detected when the analog input voltage is greater than or equal to the second reference voltage.

44. The power supply system according to claim 43, wherein said power output section includes
 means for supplying power to said battery for a charging operation, and
wherein said power control section includes
 a charge completion display section,
 means for calculating a charged capacitance and a remaining capacitance of said battery and a charging time based on a value of a current flowing from said battery,
 means for determining the completion of charging said battery from said calculated charged capacitance, remaining capacitance and charging time, and
 means for causing said charge completion display section to indicate said completion of charging.

45. The power supply system according to claim 43, wherein said power control section includes
 an AC adapter input voltage display section,
 means for detecting an input voltage of said AC adapter, and
 means for causing said AC adapter input voltage display section to indicate a voltage abnormality when said voltage abnormality occurs.

46. The power supply system according to claim 43, wherein said computer system includes
 power switch means for indicating ON/OFF modes of power supply to a computer system assembly,
 disk switch means for indicating ON/OFF modes of power supply to a disk drive, and
 reset switch means for indicating a system initialization, and
wherein said power control section includes
 means for detecting an ON or OFF signal from said power switch, disk switch and reset switch, and
 means for outputting a signal to either supply power or inhibit the supply of power to said power output section.

47. The power supply system according to claim 43, wherein said power control section includes analog-to-digital converter means for converting voltage values and current values from said battery and said AC adapter into digital values.

48. The power supply system according to claim 43, wherein said computer system is a small size personal computer.

49. The power supply system according to claim 43, wherein an externally-supplied power off request signal is sent to said computer system when a power provided on said computer system is turned off.

50. The power supply system according to claim 43, wherein an externally-supplied power off request signal is sent to said computer system when a disk drive switch provided on said computer system is turned off.

51. The power supply system according to claim 43, wherein an externally-supplied power off request signal is sent to said computer system when power of said battery is below a predetermined value.

52. The power supply system according to claim 43, wherein said power control section includes means for informing said computer system of a battery's remaining capacitance in response to a battery remaining capacitance check request from said computer system.

53. A portable computer system comprising:
 a data processor assembly including,
  a central processing unit,
  program storage means for storing a program for controlling said central processing unit and a data processing result,
  a backup memory, and a disk drive;

a serial transmission path coupled to said data processor assembly;

a power supply section comprising any of a battery and an AC adapter, said power supply section having an output voltage;

a power output section coupled to said power supply section and including coupling means for supplying power from said power supply section to said computer system, and means, responsive to a power off signal, for inhibiting the supply of all power to said computer system; and a power control section having coupling means for connecting said power control section to said computer system through a serial transmission path, means including a microcomputer for detecting a degradation of said power supply section output voltage indicative of impending power failure, for receiving an externally-supplied power off request signal and subsequently transmitting a system power off request signal through said serial transmission path to command a save operation to be performed by said computer system, and for receiving an acknowledgment signal through said serial transmission path to confirm the completion of said save operation, means for transmitting said power off signal to said power output section to inhibit the supply of power through said power output section after receipt of said acknowledgment signal, a low batter display section, means for monitoring a voltage and a current of said battery, changing a reference voltage value in accordance with a detected current value, comparing a detected voltage value with said reference voltage value and causing said low battery display section to indicate a low battery when said detected voltage value is below said reference voltage value, and means for dividing a level of said low battery into first through third sub-levels in accordance with said detected current value, causing said low battery display section to indicate said low battery upon detection of said first sub-level, sending said power off request signal to said computer system upon detection of said second sub-level, and outputting said power off signal to said power output section.

54. The system according to claim 53, wherein said data processor assembly includes means for, upon reception of said power off request signal from said power control section, causing said central processing unit to interrupt a currently running program, saving information necessary to continue said interrupted program to said backup memory, and returning said acknowledgment signal to said power control section.

55. The system according to claim 54, wherein said power control section includes means for waiting for said acknowledgment signal from said data processor assembly and for sending a time out signal to said data processor assembly and a control signal to said power output section when said acknowledgment signal is not received upon the elapse of a predetermined period of time, thereby stopping the supply of power to said disk drive.

56. A portable computer system comprising:
a data processor assembly including,
a central processing unit,
program storage means for storing a program for controlling said central processing unit and a data processing result,
a backup memory, and
a disk drive;

a serial transmission path coupled to said data processor assembly;

a power supply section comprising any of a battery and an AC adapter, said power supply section having an output voltage;

a power output section coupled to said power supply section and including coupling means for supplying power from said power supply section to said computer system, and means, responsive to a power off signal, for inhibiting the supply of all power to said computer system; and a power control section including coupling means for connecting said power control section to said computer system through a serial transmission path, means including a microcomputer for detecting a degradation of said power supply section output voltage indicative of impending power failure, for receiving an externally-supplied power off request signal and subsequently transmitting a system power off request signal through said serial transmission path to command a save operation to be performed by said computer system, the computer system saving at least contents of the program storage means into the backup memory in response to said system power off request signal, and for receiving an acknowledgment signal through said serial transmission path to confirm the completion of said save operation, and means for transmitting said power off signal to said power output section to inhibit the supply of power through said power output section after receipt of said acknowledgment signal, 57. The system according to claim 56, wherein said data processor assembly includes means for, upon reception of said power off request signal from said power control section, causing said central processing unit to interrupt a currently running program, saving information necessary to continue said interrupted program to said backup memory, and returning said acknowledgment signal to said power control section.

58. The system according to claim 57, wherein said power control section includes means for waiting for said acknowledgment signal from said data processor assembly and for sending a time out signal to said data processor assembly and a control signal to said power output section when said acknowledgment signal is not received upon the elapse of a predetermined period of time, thereby stopping the supply of power to said disk drive.

59. A portable computer system comprising:
a data processor assembly including,
a central processing unit,
program storage means for storing a program for controlling said central processing unit and a data processing result,
a backup memory, and a disk drive;

a serial transmission path coupled to said data processor assembly;

a power supply section comprising any of a battery and an AC adapter, said power supply section having an output voltage;

a power output section coupled to said power supply section and including coupling means for supplying power from said power supply section to said computer system, and means, responsive to a power off signal, for inhibiting the supply of all power to said computer system; and a power control section including coupling means for connecting said power control section to said computer system through a serial transmission path, means including a microcomputer for detecting a degradation of said power supply section output voltage indicative of impending power failure, for receiving an externally-supplied power off request signal and subsequently transmitting a system power off request signal through said serial transmission path to command a save operation to be performed by said computer system, and for receiving an acknowledgment signal through said serial transmission path to confirm the completion of said save operation, and means for transmitting said power off signal to said power output section to inhibit the supply of power through said power output section after receipt of said acknowledgment signal; and means for performing a disk drive power off sequence if said receiving means receives no acknowledgment signal during a predetermined period of time.

60. The system according to claim 59, wherein said data processor assembly includes means for, upon reception of said power off request signal from said power control section, causing said central processing unit to interrupt a currently-running program, saving information necessary to continue said interrupted program to said backup memory, and returning said acknowledgment signal to said power control section.

61. The system according to claim 59, wherein said power control section includes means for waiting for said acknowledgment signal from said data processor assembly and for sending a time out signal to said data processor assembly and a control signal to said power output section when said acknowledgment signal is not received upon the elapse of a predetermined period of time, thereby stopping the supply of power to said disk drive.

62. A portable computer system comprising:
a data processor assembly including,
a central processing unit,
program storage means for storing a program for controlling said central processing unit and a data processing result,
a backup memory, and
a disk drive;
a serial transmission path coupled to said data processor assembly;
a power supply section comprising any of a battery and an AC adapter, said power supply section having an output voltage;
a power output section coupled to said power supply section and including coupling means for supplying power from said power supply section to said computer system, and means, responsive to a power off signal, for inhibiting the supply of all power to said computer system; and a power control section including means including a microcomputer for charging the battery and for detecting completion of a charge operation when any of the following conditions is satisfied:

when the battery voltage drops from a peak value by a given value;

when a charged capacitance of the battery becomes 150%, provided that a nominal capacitance of the battery is 100%; and when a charging time of the battery exceeds 10 hours.

63. The system according to claim 62, wherein said data processor assembly includes means for, upon reception of said power off request signal from said power control section, causing said central processing unit to interrupt a currently-running program, saving information necessary to continue said interrupted program to said backup memory, and returning a power off acknowledgment signal to said power control section.

64. The system according to claim 63, wherein said power control section includes means for waiting for said power off acknowledgment signal from said data processor assembly and for sending a time out signal to said data processor assembly and a control signal to said power output section when said power off acknowledgment signal is not received upon the elapse of a predetermined period of time, thereby stopping the supply of power to said disk drive.

65. A portable computer system comprising:
a data processor assembly including,
a central processing unit,
program storage means for storing a program for controlling said central processing unit and a data processing result,
a backup memory, and
a disk drive;
a serial transmission path coupled to said data processor assembly;
a power supply section comprising any of a battery and an AC adapter, said power supply section having an output voltage;
a power output section coupled to said power supply section and including coupling means for supplying power from said power supply section to said computer system, and means, responsive to a power off signal, for inhibiting the supply of all power to said computer system; and a power control section including controller means for automatically detecting a presence or absence of the AC adapter and the battery from a first reference voltage representing a driving voltage of the controller means, a second reference voltage representing a maximum voltage of the battery, and an analog input voltage input to the power control section such that the presence of both the AC adapter and the battery are detected when the analog input voltage is less than the second reference voltage, the absence of the AC adapter and the presence of the battery are detected when the analog input voltage is between the first reference voltage and the second reference voltage, and the presence of the AC adapter and the absence of the battery are detected when the analog input voltage is greater than or equal to the second reference voltage.

66. The system according to claim 65, wherein said data processor assembly includes means for, upon reception of said power off request signal from said power control section, causing said central processing unit to interrupt a currently-running program, saving information necessary to continue said interrupted program to said backup memory, and returning a power off acknowledgment signal to said power control section.

67. The system according to claim 66, wherein said power control section includes means for waiting for said power off acknowledgment signal from said data processor assembly and for sending a time out signal to said data processor assembly and a control signal to said power output section when said power off acknowledgment signal is not received upon the elapse of a predetermined period of time, thereby stopping the supply of power to said disk drive.

* * * * *

UNITED STATES PATENT AND TRADEMARK OFFICE
CERTIFICATE OF CORRECTION

PATENT NO. : 5,339,446
DATED : August 16, 1994
INVENTOR(S) : Takuma Yamasaki et al It is certified that error appears in the above-indentified patent and that said Letters Patent is hereby corrected as shown below:

Claim 1, column 9, line 26, "batter" should read --battery--.

Claim 53, column 17, line 15, "having" should read --including--;

line 34, "batter" should read --battery--.

Claim 56, column 18, line 44, "signal", should read --signal--.

Signed and Sealed this

First Day of August, 1995

Attest:

BRUCE LEHMAN

*Attesting Officer*  *Commissioner of Patents and Trademarks*